(12) United States Patent
Mahkonen

(10) Patent No.: US 8,254,376 B2
(45) Date of Patent: Aug. 28, 2012

(54) SIMPLE ADAPTIVE JITTER BUFFERING ALGORITHM FOR NETWORK NODES

(75) Inventor: Arto Juhani Mahkonen, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 313 days.

(21) Appl. No.: 12/811,667

(22) PCT Filed: Jan. 25, 2008

(86) PCT No.: PCT/SE2008/050090
§ 371 (c)(1),
(2), (4) Date: Jul. 2, 2010

(87) PCT Pub. No.: WO2009/093945
PCT Pub. Date: Jul. 30, 2009

(65) Prior Publication Data
US 2010/0296525 A1     Nov. 25, 2010

(51) Int. Cl.
*H04L 12/66* (2006.01)
(52) U.S. Cl. .................. 370/352; 370/413; 370/516
(58) Field of Classification Search .......... 370/229–231, 370/235, 352–356, 412–413, 465, 516–517
See application file for complete search history.

(56) References Cited

U.S. PATENT DOCUMENTS

| | | | |
|---|---|---|---|
| 6,452,950 B1 * | 9/2002 | Ohlsson et al. | 370/516 |
| 6,683,889 B1 * | 1/2004 | Shaffer et al. | 370/516 |
| 6,684,273 B2 * | 1/2004 | Boulandet et al. | 710/52 |
| 6,862,298 B1 * | 3/2005 | Smith et al. | 370/516 |
| 7,006,511 B2 * | 2/2006 | Lanzafame et al. | 370/412 |
| 7,359,324 B1 * | 4/2008 | Ouellette et al. | 370/230 |
| 7,573,894 B2 * | 8/2009 | Schulz et al. | 370/412 |
| 7,680,099 B2 * | 3/2010 | Lakaniemi | 370/352 |
| 7,817,677 B2 * | 10/2010 | Black et al. | 370/516 |
| 2005/0058146 A1 * | 3/2005 | Liu et al. | 370/412 |
| 2007/0211704 A1 | 9/2007 | Lin et al. | |

FOREIGN PATENT DOCUMENTS

| | | |
|---|---|---|
| JP | 2007150914 A | 6/2007 |
| WO | 0042749 A1 | 7/2000 |

OTHER PUBLICATIONS

Sharma, Deepak, "VoP (voice over packet)", IEEE Potentials, 20021001, vol. 21, NR 4, Oct./Nov. 2002, pp. 14-17.

* cited by examiner

*Primary Examiner* — Frank Duong
(74) *Attorney, Agent, or Firm* — Rothwell, Figg, Ernst & Manbeck, P.C.

(57) ABSTRACT

A method of dynamically adjusting the buffer delay of an adaptive jitter buffer of a network node receiving packets of a media stream from a packet switched network. The method comprises inserting packets arriving to the network node into the jitter buffer and executing a jitter buffering procedure once every $Trep_{in}$, wherein $Trep_{in}$ is equal to the jitter buffer play-out interval. Executing the jitter buffer procedure involves updating a jitter protection time, $T_{jit}$, wherein $T_{jit}$ defines a current target value for the maximum buffering delay, on the basis of the variation of the number of pending packets, N in the jitter buffer.

14 Claims, 8 Drawing Sheets

SIMPLE ADAPTIVE JITTER BUFFERING ALGORITHM FOR NETWORK NODES

CROSS-REFERENCE TO RELATED APPLICATION

This application is a 35 U.S.C. §371 National Phase Application from PCT/SE2008/050090, filed Jan. 25, 2008, and designating the United States.

TECHNICAL FIELD

The present invention relates generally to a simple method of adapting the delay of a jitter buffer according to the variation of the number of pending packets in the buffer.

BACKGROUND

When a media stream in a conventional media service, such as e.g. a telephony service, is received by a network node, such as e.g. a media gateway, from an interface where transport delay tends to vary over a wide range, a jitter buffer will be required at the input of the network node in order to guarantee a continuous and constant rate of the play-out from the network node towards another interface, which may require a very limited variation in the output timing.

The general principles of jitter buffering in a network node is described with reference to FIG. 1. It is to be understood that only parts which are essential for the understanding of jitter buffering are shown in the figure, while other parts necessary for the speech processing functions, such as e.g. speech encoders and decoders, have been omitted for simplicity reasons. For the same reasons, the figure only describes how media transmission is executed in one direction, i.e. in the uplink, omitting the downlink transmission, which completes a two-way conversation.

In FIG. 1, a speech source 100, which is configured to deliver real-time data in a media stream, to one or more users, generates packets with a constant time interval, $Trep_{in}$ 102. As the packets are routed through a packet switched network 101, a transport delay which is not constant will be introduced to the media stream. In the figure this phenomenon, referred to as jitter, is illustrated as packets, leaving network 101 with irregular intervals, 103. Since a number of packets may arrive to an intermediate network node 104 with very short time intervals, i.e. in bursts, followed by a time interval when no packets arrive at all, the pattern with which packets arrive to the network node may be difficult to predict and to handle.

A common way to keep the jitter under control is to implement a jitter buffer 105 at the intermediate network node 104. In addition to the transport delay, caused by the network, the jitter buffer 105 will introduce another delay, which can be identified as a jitter protection time $T_{jit}$ 106, as packets arriving to the network node are buffered 107 into the jitter buffer before they are played-out 108 from the network node with a recovered constant interval, $Trep_{out}$ 109 which is equivalent to $Trep_{in}$. The packets can now be forwarded to one or more terminating entities (not shown) via another transport network 110, typically a circuit switched network, which does not tolerate jitter.

If $T_{jit}$ 106 is a pre-set constant, the jitter buffering is called static buffering, and, thus, all buffered packets will experience the same jitter buffer delay. If on the other hand $T_{jit}$ is allowed to change on the basis of some kind of analysis of the behaviour of the delay at the input of the network node, the buffering method is instead referred to as adaptive jitter buffering.

In order to avoid longer delays than what is absolutely necessary, adaptive jitter buffering is preferred over static buffering. In order to operate properly, a jitter buffer enabling static buffering has to be dimensioned for the worst case variation of the delay, and, thus, the delay caused by static buffering will typically be much higher than what is required for dynamic buffering, especially when the worst case occurs relatively seldom.

Adaptive jitter buffering algorithms are usually developed for receiving ends of terminals or clients, which typically are assigned for a single end user. In network nodes, however, one processing unit is typically shared by tens, or even hundreds of concurrent users, or stream instances. In such a situation, simplicity of the buffering algorithm will become a vital issue, in order for the operator to keep the processing costs per channel low.

When dimensioning network buffers, there is usually a trade-off between simplicity and the perceptual quality which has to be taken into consideration. This means that the buffering algorithm implemented at a network node should be as simple as possible, but still good enough in quality, without the quality having to reach the quality level which is necessary at a typical end-user terminal. A scalable play-out requires a rather complex function at network nodes, compared to what is required at end-user terminals. In network nodes, speeding up, or catching up, is usually made by skipping packets, or frames, while slowing down is realised by inserting frames, i.e. as error concealment packets.

SUMMARY

The object of the present invention is to address at least some of the problems outlined above. In particular, it is an object to provide an adaptive delay of a jitter buffer which may be adaptively adjusted according to the variation of the number of pending packets in the buffer.

According to a first aspect, a method of dynamically adjusting the buffer delay of an adaptive jitter buffer of a network node receiving packets of a media stream from a packet switched network is provided, wherein the method comprises the following steps:
  inserting packets arriving to the network node into the jitter buffer, and
  executing a jitter buffering procedure once every $Trep_{in}$, $Trep_{in}$ being equal to the jitter buffer play-out interval, wherein a jitter protection time, $T_{jit}$ defining a current target value for the maximum buffering delay, is being updated on the basis of the variation of the number of pending packets, N in the jitter buffer.

The jitter buffering procedure may comprise the following initial steps:
  determining whether said media stream is presently in a silence period or whether the most recently received packet is a speech packet or a SID, and
  executing an adaptation procedure for updating $T_{jit}$ during a talk spurt in case the most recently received packet is a speech packet, or
  executing an adaptation procedure for updating $T_{jit}$ during a silence period in case said media stream is presently in a silence period or in case the most recently received packet is a SID.

The adaptation procedure for adjusting $T_{jit}$ during a talk spurt or a media spurt may comprise the following steps:
  monitoring N, in order to update the smallest value of N, $N_{min}$ and the largest value of N, $N_{max}$, registered over an adaptation interval, ADAPT_INT, ADAPT_INT defining a predetermined number of iterations of the adaptation procedure, defining an updated target value, $T_j$ for $T_{jit}$ on the basis of the variation of N, such that:

$$T_j = (N_{max} - N_{min}) * Trep_{in}$$

$T_j$ being an indicator of the required adjustment of $T_{jit}$, and adjusting $T_{jit}$ in case the number of iterations of the adaptation procedure since the last adjustment of $T_{jit}$ equals ADAPT_INT.

Furthermore, the adjusting step may comprise the following steps:

increasing $T_{jit}$ according to $T_j$ in case the variation of N is higher than what the current $T_{jit}$ can handle, or decreasing $T_{jit}$ according to $T_j$, in case the current $T_{jit}$ is dimensioned for a larger variation of N than the current variation.

In addition, the adjusting step may also comprise the following steps:

instantly updating $T_{jit}$ to equal $T_j$, executing a fast attack, in case $T_j$ exceeds $T_{jit}$, or gradually decreasing $T_{jit}$ towards the current $T_j$, performing a slow decay, and gradually dropping the oldest packet from the buffer at a relaxed rate until $T_{jit}$ corresponds to the current variation of N in case the present maximum buffer delay time, $N*Trep_{in}$ exceeds a predetermined threshold, catchUpLimit.

The catchUpLimit may be defined as:

$$catchUpLimit = T_j + Trep_i$$

in case $T_{jit}$ has not been updated and the current $T_j$ exceeds the current $T_{jit}$, or as:

$$catchUpLimit = T_{jit} + Trep_{in}$$

otherwise.

If during a silence period, or in case the most recently received packet is a SID, the adaptation procedure for adapting $T_{jit}$ may comprise the following steps:

updating $T_{jit}$ in case the number of iterations of the procedure for adapting during a talk spurt since the last adaptation of $T_{jit}$ executed by said procedure exceeds a predetermined silence period adaptation limit, DTXLimit, defining an updated target value, $T_j$ for $T_{jit}$, on the basis of the variation of N, such that:

$$T_j = (N_{max} - N_{min}) * Trep_{in}$$

$T_j$ being an indicator of the required adjustment of $T_{jit}$ wherein $N_{max}$ is the largest, and $N_{min}$ is the smallest value of N that has been measured over an adaptation interval, ADAPT_INT, ADAPT_INT defining a predetermined number of iterations of the adaptation procedure, and increasing $T_{jit}$ according to $T_j$ in case the variation of N is higher than what the current $T_{jit}$ can handle.

The adjusting step may further comprises the following steps:

instantly updating $T_{jit}$ to equal $T_j$, executing a fast attack, in case $T_j$ exceeds $T_{jit}$, and gradually dropping the oldest packet from the buffer at a relaxed rate until $T_{jit}$ corresponds to the current variation of N, in case the present buffer delay time, $N*Trep_{in}$ exceeds a predetermined threshold, catchUpLimit, wherein catchUpLimit may be defined as:

$$catchUpLimit = T_j + Trep_{in}$$

The media stream may be i.e. an audio stream, or a video stream.

According to another aspect, also a node comprising an adaptive jitter buffer for receiving packets of a media stream from a packet switched network is provided, wherein the node being adapted to dynamically adjust the buffer delay comprises:

a receiving unit for receiving packets arriving to the node, and a buffering unit for inserting packets arriving to the network node into the jitter buffer, and for executing a jitter buffering procedure once every $Trep_{in}$, $Trep_{in}$ being equal to the jitter buffer play-out interval, wherein a jitter protection time, $T_{jit}$ defining a current target value for the maximum buffering delay, is being updated on the basis of the variation of the number of pending packets, N in the jitter buffer.

The buffering unit may be adapted to execute the following steps:

determining whether said media stream is presently in a silence period or whether the most recently received packet is a speech packet or a SID, and executing an adaptation procedure for updating $T_{jit}$ during a talk spurt in case the most recently received packet is a speech packet, or executing an adaptation procedure for updating $T_{jit}$ during a silence period in case said media stream is presently in a silence period or in case the most recently received packet is a SID.

In case the buffering unit is executing an adaptation procedure for updating $T_{jit}$ during a talk spurt or a media spurt, the buffering unit may further be adapted to execute the following steps:

monitor N, in order to update the smallest value of N, $N_{min}$ and the largest value of N, $N_{max}$, registered over an adaptation interval, ADAPT_INT, defining an updated target value, $T_j$ for $T_{jit}$ on the basis of the variation of N, such that:

$$T_j = (N_{max} - N_{min}) * Trep_{in}$$

$T_j$ being an indicator of the required adjustment of $T_{jit}$, and adjusting $T_{jit}$ in case the number of iterations of the adaptation procedure since the last adjustment of $T_{jit}$ equals ADAPT_INT.

When executing the adjusting step, the buffering unit may further be adapted to execute the following steps:

increasing $T_{jit}$ according to $T_j$ in case the variation of N is higher than what the current $T_{jit}$ can handle, or decreasing $T_{jit}$ according to $T_j$, in case the current $T_{jit}$ is dimensioned for a larger variation of N than the current variation.

In addition, when executing the adjusting step, the buffering unit may be adapted to further include the following steps:

instantly updating $T_{jit}$ to equal $T_j$, executing a fast attack, in case $T_j$ exceeds $T_{jit}$, or gradually decreasing $T_{jit}$ towards the current $T_j$, performing a slow decay, and gradually dropping the oldest packet from the buffer at a relaxed rate until $T_{jit}$ corresponds to the current variation of N in case the present maximum buffer delay time, $N*Trep_{in}$ exceeds a predetermined threshold, catchUpLimit.

The buffering unit may be adapted to define catchUpLimit as:

$$catchUpLimit = T_j + Trep_{in}$$

in case $T_{jit}$ has not been updated and the current $T_j$ exceeds the current $T_{jit}$, or as:

$$catchUpLimit = T_{jit} + Trep_{in}$$

otherwise.

If during a silence period or if the most recently received packet is a SID, said buffering unit may instead be further adapted to execute the following steps:

updating $T_{jit}$ in case the number of iterations of the procedure for adapting during a talk spurt since the last adaptation of $T_{jit}$ executed by said procedure exceeds a predetermined silence period adaptation limit, DTXLimit, defining an updated target value, $T_j$ for $T_{jit}$, on the basis of the variation of N, such that:

$$T_j = (N_{max} - N_{min}) * \text{Trep}_{in}$$

$T_j$ being an indicator of the required adjustment of $T_{jit}$ wherein $N_{max}$ is the largest, and $N_{min}$ is the smallest value of N that has been measured over an adaptation interval, ADAPT_INT, ADAPT_INT defining a predetermined number of iterations of the adaptation procedure, and increasing $T_{jit}$ according to $T_j$ in case the variation of N is higher than what the current $T_{jit}$ can handle.

During the adjusting step, the buffering unit may further be adapted to execute the following steps:

instantly updating $T_{jit}$ to equal $T_j$, executing a fast attack, in case $T_j$ exceeds $T_{jit}$, and gradually dropping the oldest packet from the buffer at a relaxed rate until $T_{jit}$ corresponds to the current variation of N, in case the present buffer delay time, $N*\text{Trep}_{in}$ exceeds a predetermined threshold, catchUpLimit.

BRIEF DESCRIPTION OF THE DRAWINGS

The present invention will now be described in more detail by means of exemplary embodiments and with reference to the accompanying drawings, in which.

DETAILED DESCRIPTION

Figure 1:
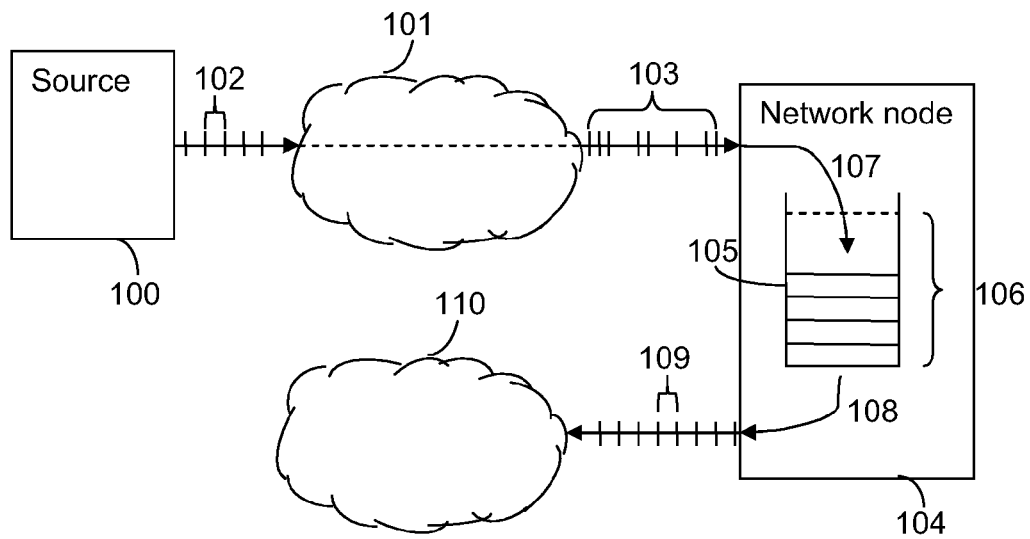
FIG. 1 illustrates a basic overview of the principles of jitter buffering, according to the prior art.

Briefly described, the present invention relates to a simple adaptive jitter buffering algorithm, and more specifically, to a way of adapting the delay of a jitter buffer on the basis of the variation of the number of pending packets in the buffer.

A network node, e.g. a media gateway, receives packets, transmitted from a real-time streaming source, and routed via a packet switched network that introduces an unpredicted transport delay, i.e. jitter to the packet stream. In order to be able to cope with the jitter, thereby allowing a play-out with a constant delay from the network node, and in order to keep the delay introduced by the buffering low, the node is provided with an adaptive jitter buffer. For such a jitter buffer, which typically handles a considerable number of concurrent users, to operate with a good performance, a simple buffering algorithm will be desired.

The delay caused by the jitter buffer is determined by the jitter protection time, $T_{jit}$. $T_{jit}$ is a parameter which, if optimised will enable the buffer to handle a various number of pending packets in the buffer, i.e. to buffer arriving packets, without having to drop any packets, except when packets are deliberately dropped, i.e. during a catching up, which is performed in order to adjust the delay according to the current jitter situation.

The total delay from the source to the play-out is the sum of the transport delay and the delay introduced by the buffering, i.e. the longer the transport delay of a packet has been, the shorter the buffering delay will be, and vice versa. $T_{jit}$ will define a target value for the maximum buffering delay. This means that the experienced buffering delay will approach $T_{jit}$ only when the transport delay is at its minimum. The buffering delay should be kept as constant as possible, and in the same time as small as possible. These requirements are contradictory and requires a trade off.

By continuously adapting $T_{jit}$ on the basis of the variation of the number of pending packets in the jitter buffer it will be possible to adapt the jitter buffer delay to the behaviour of the jitter, experienced at the input of the network node, and to the requirements mentioned above.

According to one embodiment of the claimed invention, the number of pending packets, N in the jitter buffer will be continuously monitored and the highest and the lowest of the monitored values, i.e. $N_{max}$ and $N_{min}$, respectively, will be used for determining the variation of the number of pending packets.

During a talk spurt, carrying speech packets, or a media spurt, carrying media packets, e.g. video, the variation of the number of pending packets will be registered over a certain short adaptation interval, defined as ADAPT_INT, wherein ADAPT_INT is a predetermined tuning parameter, indicating the minimum interval with which $T_{jit}$ will be updated. During a talk spurt or a media spurt an adaptation procedure will be executed at regular intervals, wherein a counter is incremented at each iteration. Once the counter equals ADAPT_INT, $T_{jit}$ will be adapted accordingly. Subsequent to an adaptation of $T_{jit}$, the content of the jitter buffer will be adjusted by catching-up, i.e. by dropping a packet from the jitter buffer, if necessary. Since packets has to be delivered from the jitter buffer and the network node at a continuous rate, the adaptation procedure will be followed, either by pulling and processing a packet, or by generating a concealment packet.

Another parameter, $T_j$ which gives an indication of a new target value of $T_{jit}$, i.e. an indication of whether $T_{jit}$ should be adapted smaller or larger, depending on the expected variation of N, may be expressed as:

$$T_j = (N_{max} - N_{min}) * \text{Trep}_{in} \tag{1}$$

where $\text{Trep}_{in}$ is the nominal repetition interval with which packets are transmitted from the source, being equal to the nominal repetition interval, $\text{Trep}_{out}$ with which packets are delivered from the jitter buffer and the network node.

Figure 2A:
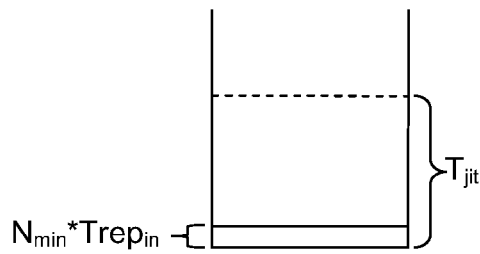
FIG. 2a-d illustrates possible variations of a jitter buffer level for a buffer operating according to the claimed invention.
Figure 2B:
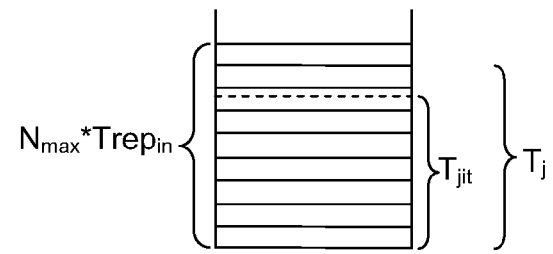

Different scenarios for an adaptive jitter buffer and the effects on a buffer using the proposed adaptive jitter buffering algorithm according to one embodiment will now be described with reference to FIGS. 2a-d. FIGS. 2a and 2b illustrates one typical scenario, where FIG. 2a shows the minimum number, $N_{min}$ of pending packets in the jitter buffer, while FIG. 2b shows the maximum number, $N_{max}$ of pending packets, registered over a time interval defined as ADAPT_INT*$Trep_{in}$.

In the scenario described with FIGS. 2a and 2b, the variation of the number of pending packets is rather high. Such a scenario can be expressed as:

$$T_j > T_{jit} \qquad (2)$$

Obviously, the variation of pending packets results in a $T_j$ that exceeds the present jitter protection time, $T_{jit}$, i.e. $T_j$ indicates that $T_{jit}$ has to be increased in order for the jitter buffer to be able to handle the current variation of the jitter.

Figure 2C:
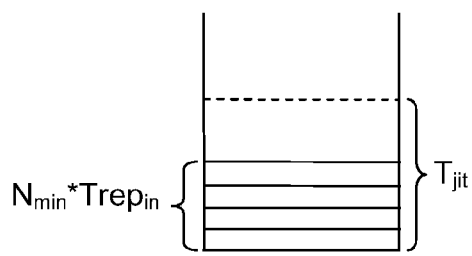
Figure 2D:
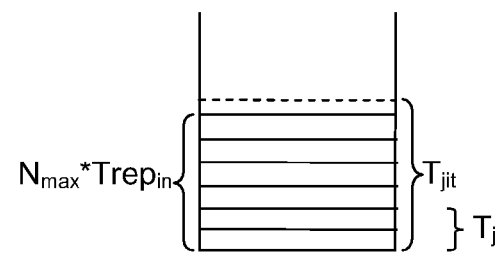

FIGS. 2c and 2d on the other hand shows a situation with a low variation of the number of pending packets in the jitter buffer. This situation can instead be described as:

$$T_j < T_{jit} \qquad (3)$$

In this scenario, the present $T_{jit}$, has a value which enables the buffer to handle all arriving packets accordingly, but exaggerates the present delay, and, as a consequence, the delay can, and will be made smaller by speeding up, i.e. by dropping packets/frames every now and then. Obviously, also $T_{jit}$ will be adapted smaller.

When the transport delay at the input of the network node is long, the number of packets in the jitter buffer gradually decreases. If a packet is delayed more than the current value of $T_{jit}$ tolerates, the number of pending packets may even reach zero. A scenario illustrating a long transport delay, is illustrated in FIGS. 2a and 2c. If the buffer has become empty, when a packet ought to be played-out during a talk spurt or a media spurt, an error concealment will be inserted into the buffer, enabling the node to continuously play-out something with a constant rate. Effectively, this is referred to as an embedded slowing down of the play-out.

In a typical subsequent scenario, the transport delay occasionally tends to get short for a limited period of time, so that the inter-arrival time at the buffer input temporarily becomes shorter than the nominal repetition interval, $Trep_{in}$ of the packets at the source. The fact that the play-out interval on the jitter buffer output has to be constant, i.e. equal to $Trep_{in}$, in order to provide speech of good quality to one or more terminating entities, may lead to a situation where the number of pending packets in the jitter buffer gradually increases. Such a situation is illustrated with FIGS. 2b and 2d.

If a delay peak occurs without resulting in any packet loss, packets on their way to the buffer will eventually arrive, either in a burst or with a short inter-arrival time, and the number of pending packets, N in the jitter buffer may even exceed a previously set upper limit. This means that from now on the effective jitter protection time, or the target value of $T_{jit}$, i.e. $T_j$, may have increased to a level above the current value of $T_{jit}$, as indicated in FIG. 2b.

If long delay peaks and bursts occur intermittently, causing the jitter buffer level to increase above the current value of $T_{jit}$, the proposed jitter buffer algorithm will adjust $T_{jit}$ so that it is increased immediately in order to meet the monitored difference of $N_{max}$ and $N_{min}$ and the present value of $T_j$. Such a scenario is typically referred to as a fast attack.

If there are no more long delay peaks, and the subsequent bursts are of a decreasing nature, the variation of the number of pending packets in the buffer gradually will get small again. $T_{jit}$, however, will remain at a relatively high level, as shown in FIG. 2d. In such a situation, the buffering algorithm will begin to skip over and drop the oldest packet from the buffer at a certain relaxed rate, until $T_{jit}$ has reached a level that corresponds to $T_j$ again. This is effectively referred to as an embedded speeding-up of the play-out, and is also called a slow decay or a catching-up of the adaptation. Consequently the described adaptation algorithm has a fast attack, but a slow decay.

An adaptive jitter buffering mechanism, especially adapted to operate in a network node, according to the present embodiment, relies on a simple adaptation algorithm. The overall principals of such an algorithm will now be explained in further detail with reference to FIG. 3-FIG. 7.

Packets arriving at the network node will be handled by the jitter buffer at a regular interval, $Trep_{in}$, and, thus, an appropriate timing of the jitter buffer input will be required. How this may be achieved in a scenario for handling arriving speech packets, transmitted from a speech source will now be described with reference to FIG. 3.

Figure 3:
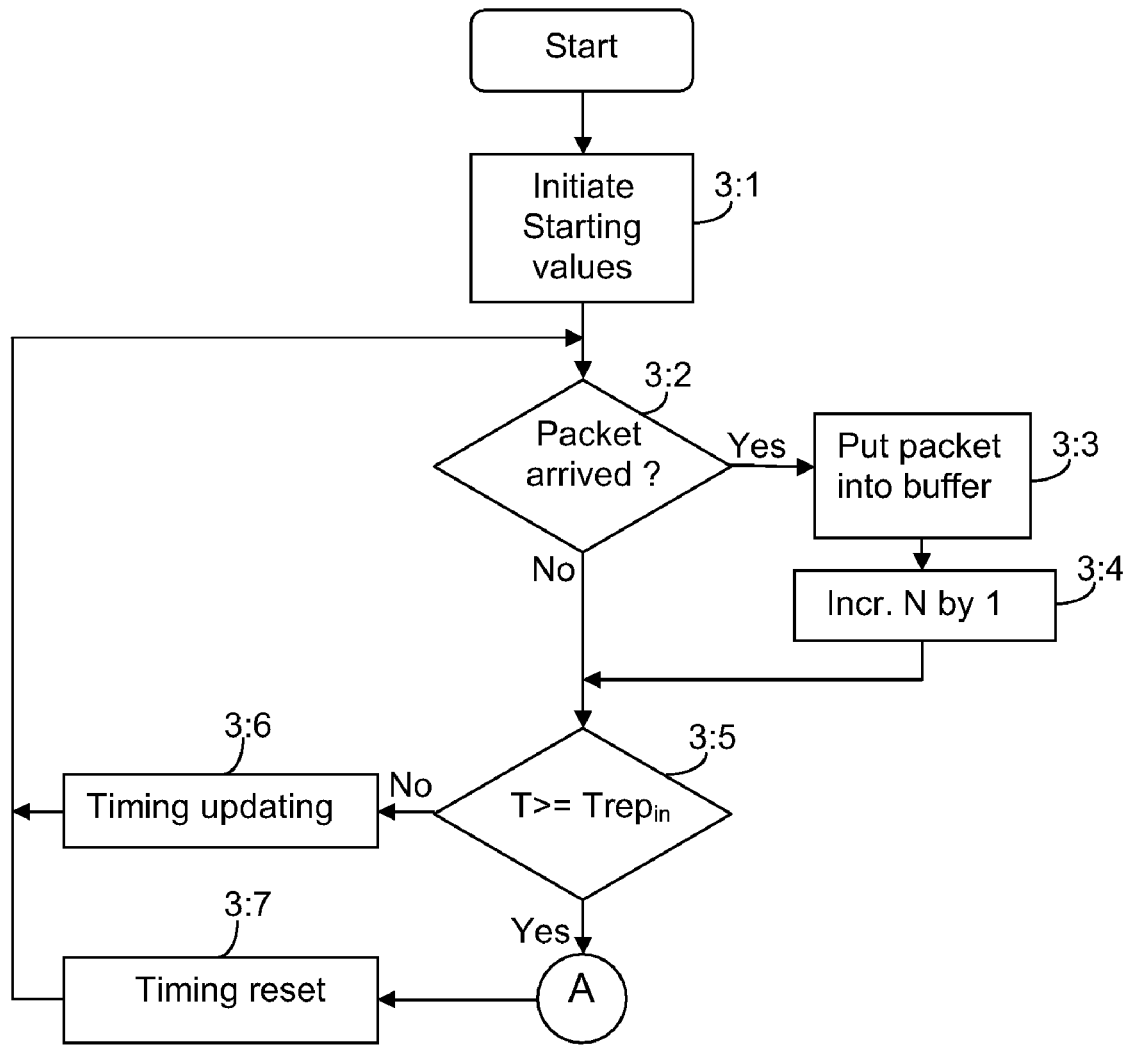
FIG. 3 illustrates the overall principles of reception of packets and timing, in accordance with one embodiment.

The block diagram of FIG. 3 shows the overall principles of packet reception and timing at the jitter buffer. According to the figure, packets are put into the jitter buffer as they arrive from a transport network, typically with a varying delay, and an adaptive jitter buffering mechanism, indicated as A in the figure, will be executed on a regular basis, i.e. with the time interval $Trep_{in}$, which typically may be e.g. 20 ms.

In a first step 3:1, the buffering starts by initializing variables which will be needed during the subsequent adaptation of the jitter buffer protection time, N, indicating the number of currently pending packets in the buffer, $N_{max}$, and two counters, cntr1 and cntr2, are reset. During the initialization performed at step 3:1, $N_{min}$ is also set to a predefined value, MAX_VAL, which has been chosen to a value sufficiently high, so that it under no circumstances will be exceeded by the number of pending packets, N in the jitter buffer. MAX_VAL could therefore be set e.g. to 1000, or to the biggest positive integer value of a processing unit, e.g. 32767.

In order to provide an appropriate timing during the reception of packets, a time interval T, may be defined as:

$$T = currT - prevT \qquad (4)$$

where currT represents the current time given by the host and prevT represents the previous time the jitter buffer algorithm A was executed. At step 3:1, prevT is set equal to currT, while time interval parameter, T is reset. $T_{jit}$ is also set to a suitable initiation value, ranging between $T_{jitmin}$ and $T_{jitmax}$, being an acceptable adaptation range specified for $T_{jit}$. $T_{jitmin}$ and $T_{jitmax}$ are typically configuration parameters which are chosen depending on the buffer input interface. A typical value for $T_{jitmin}$ may be, e.g. 20 ms, while $T_{jitmax}$ may be set to e.g. 200 ms. A suitable initiation value for $T_{jit}$ may then be derived e.g. as:

$$T_{jit} = (T_{jitmin} + T_{jitmax})/2 \qquad (5)$$

As long as the time period $Trep_{in}$ has not elapsed, which is continuously checked at a step 3:5, packets arriving to the network node will be put into the jitter buffer, as indicated with a step 3:2, and another step 3:3. In a subsequent step 3:4, counter N is incremented by 1, and the timing, T of the buffer is updated at another step 3:6, before the loop handling arriving packets is repeated, starting again at step 3:2.

However, once $Trep_{in}$ has elapsed, a procedure, A, adapted to perform jitter buffering, will be executed. Subsequent to the execution of the jitter buffering procedure A, the timing of the buffer will be reset by setting prevT to currT, as indicated in a step 3:7, and the procedure for putting arriving packets into the jitter buffer will be repeated, starting at step 3:2.

As indicated with step 3:5, a jitter buffering procedure will be executed once every $Trep_{in}$. An example of such a jitter buffering procedure according to one embodiment will now be described in further detail, referring to the block diagram of FIG. 4.

If discontinuous transmission of speech (DTX) is enabled, it should first be determined whether the received speech is within a silence period, or if the most recently received packet is a silence descriptor, i.e. a SID. The latter check is accompanied by peeking the most recently received packet in the jitter buffer, wherein the relevant content of the most recent packet is accessed from the buffer without actually pulling any packets out from the buffer yet. In this case, the relevant content will be the frame type, i.e. SID or speech. If any of these conditions are met, the block diagram will branch to C. The procedure defined by C, will be described in further detail below, with reference to FIG. 6.

If, however, none of these conditions are met, or if DTX is disabled, the block diagram will instead branch to B, and a jitter buffer adaptation procedure for handling a talk spurt will be executed. An example of such a procedure according to one embodiment will be described in further detail below, this time with reference to FIG. 5.

If an ongoing talk spurt is identified at the initial step 4:1 of jitter buffering procedure A, the block diagram will branch to B, where an adaptation procedure, adapted to handle a talk spurt will be executed. When procedure B, resulting in an updated $T_{jit}$, has terminated, it is first determined whether the jitter buffer is empty or not, as indicated with a step 4:2.

If it is found that the buffer is empty, something still has to be delivered from it, and, thus, an error concealment is inserted into the buffer, as indicated in a next step 4:3, before the procedure is terminated at a final step 4:4. If, however, there are presently one or more packets in the jitter buffer, it is instead determined whether the talk spurt is at its beginning or not. This check is done at a subsequent step 4:5. If it is found that the talk spurt is not at its beginning, the oldest packet is pulled from the buffer, as indicated with a step 4:7, consequently, N is decremented by one, as indicated in step 4:8, and the oldest speech packet is processed accordingly in another step 4:9, before the branch terminates at step 4:4.

If, however, it is found that the talk spurt is at its beginning in step 4:5, the next step is to determine if the oldest packet in the jitter buffer has been buffered long enough to be processed, i.e. longer than or equal to $T_{jit}$. This is done at another step 4:6. Before this has occurred, nothing will be pulled from the jitter buffer and comfort noise will instead be inserted into the buffer, as indicated in step 4:17.

During a silence period, packets, or SID-frames, are transmitted from a transmitting source with a lower rate than during a talk spurt and the procedure has to check when a SID frame ought to be processed, or when there is nothing to pull from the jitter buffer.

When $T_{jit}$ instead has been adapted at adaptation procedure C, it is first checked once more, whether the speech is in a silence period or not, as indicated with a next step 4:10. This will be necessary, since branching to C is also made when the oldest packet in the jitter buffer is still in the talk spurt, but the newest, peeked packet is already a SID. If it is found that the speech is not in a silence period, the oldest packet will be pulled and processed, just as for the talk burst case, as indicated with steps 4:7-4:9. In resemblance to the talk spurt case, the jitter buffering procedure is then terminated at the final step 4:4, and the algorithm continues to handle packets, arriving to the network node, starting at timing reset step 3:7 of FIG. 3.

If it is instead found in step 4:10 that the speech is in a silence period, something still has to be delivered from the jitter buffer of the network node with a constant packet rate of $Trep_{in}$. In such a case, the next step, executed in a step 4:11, will be to check whether it is time to pull a SID from the buffer or not. This checking is based on a known SID-frame interval, e.g. every 8:th frame could be a SID during a silence period. If it is not yet time for a SID to be pulled, comfort noise will instead be inserted at the buffer output in order to keep the constant output rate also when the input rate is reduced during the silence period. The characteristics of the comfort noise are updated by the SID-frames, and the comfort noise is inserted at step 4:17.

If it is instead found in step 4:11 that it is time to pull a SID from the jitter buffer, but the jitter buffer is found to be empty in a next step 4:12, a SID concealment will be generated at a subsequent step 4:13, instead of executing a SID processing. If, however, there are indeed one or more packets pending in the jitter buffer, the oldest packet will instead be pulled from the jitter buffer, as indicated in a subsequent step 4:14, N is then decremented by 1 in a subsequent step 4:15, and a SID is processed in a next step 4:16.

During silence periods, comfort noise will always be inserted to the output, independently of whether a SID has been pulled or not. Subsequent to both a SID concealment, executed at step 4:13, and a SID processing, executed at step 4:16, a comfort noise will therefore be inserted into the jitter buffer in the subsequent step 4:17.

Next, the branch is terminated at the final step 4:4 and the algorithm continues to handle arriving packets by putting them into the jitter buffer of the network node, as indicated with the loop of FIG. 3.

The adaptation procedure to be executed during a talk spurt, referred to as B in FIG. 4, will now be described in more detail with reference to a block diagram of FIG. 5.

In a first step 5:1, it is determined if there are presently more pending packets in the jitter buffer than what can be handled by the buffer, i.e. if:

$$N*Trep_{in} > T_{jitmax} \quad (6)$$

If the required jitter protection time $N*Trep_{in}$ do exceed the maximum jitter protection time, $T_{jitmax}$, the oldest packet will be pulled from the jitter buffer, as indicated in a next step 5:2 and, consequently, N is decremented by 1 in a subsequent step 5:3. This procedure will be iteratively repeated as long as the required jitter protection time exceeds $T_{jitmax}$. If required, any of the two parameters $N_{max}$ and $N_{min}$, used when continuously deriving the variation of the number of pending packets, is then updated in the respective subsequent steps 5:4 and 5:5 or steps 5:6 and 5:7.

In a next step 5:8, $T_j$ is derived on the basis of the updated parameters $N_{max}$ and $N_{min}$. The present $T_j$, defined by equation (1) will be used when adapting $T_{jit}$ at the end of the adaptation interval, ADAPT_INT. ADAPT_INT is a tuning parameter, which, on the basis of experiments, may be set to e.g. 16. With a $Trep_{in}$ that is set to 20 ms, ADAPT_INT set to 16, will correspond to an adaptation period, ADAPT_INT*$Trep_{in}$, that equals 320 ms. In addition, a counter, referred to as cntr1, having the purpose of keeping track of when the adaptation interval, ADAPT_INT has been reached, i.e. when it is time to adapt $T_{jit}$, is also incremented by 1 in step 5:8.

In a subsequent step 5:9, the updated $T_j$ is compared to the present $T_{jit}$, and depending on the result of such a comparison, a variable referred to as catchUpLimit, indicating the currently highest tolerable target level of the jitter buffering delay, will be set. The variable catchUpLimit will be used later in catch-up procedure D in order to determine if a packet is to be pulled from the jitter buffer for speeding up, i.e. catching up, the play-out of the jitter buffer as a result of the updated $T_{jit}$.

If it is found in step 5:9 that $T_j$ exceeds $T_{jit}$, i.e. that $T_{jit}$ is presently too small and should be increased in order to prevent buffer underflow with the currently experienced increasing jitter, catchUpLimit will be set, on the basis of the current $T_j$, as indicated in a step 5:10, while catchUpLimit will instead be set, based on $T_{jit}$, as indicated in another step 5:11, if the current value of $T_{jit}$ is found to be adequate, or even too high, causing an unnecessarily high jitter buffer delay.

In a next step 5:12 it is determined whether a talk spurt has lasted long enough for cntr1 to have reached ADAPT_INT or not, i.e. if it is time to adapt $T_{jit}$. If ADAPT_INT has not expired yet, the procedure continues by executing the catch-up procedure, indicated as D in FIG. 5, on the basis of the present catchUpLimit. The catch-up procedure is set to gradually adapt the jitter buffer delay smaller by caching-up, i.e. pulling the oldest packet from the jitter buffer, whenever this is found applicable. Subsequent to executing the catch-up procedure D, adaptation procedure B will be terminated at a final step 5:13. Catch-up procedure, D will be described in further detail later with reference to FIG. 7.

If, however, it is found in step 5:12 that ADAPT_INT has expired, the jitter protection time, $T_{jit}$ will be adapted accordingly before the catch-up procedure D will be executed. In a step 5:14, $T_j$ is once again compared to $T_{jit}$. If it is found that $T_j$ exceeds $T_{jit}$, a fast attack will be executed, i.e. $T_{jit}$ will be increased to the present value of $T_j$ instantly in a next step 5:15.

If, on the other hand, $T_{jit}$ does not exceed $T_j$, this is an indication that $T_{jit}$ should be decreased and, thus, a slow decay will instead be executed, i.e. $T_{jit}$ will be adapted by gradually decreasing $T_{jit}$ towards T, as indicated in another step 5:16.

During a slow decay, the adaptation, i.e. the decreasing of $T_{jit}$ downwards is relaxed by equations (7) and (8). $T_{jit}$ is limited so that it never decreases $T_{jitmin}$. Such an adaptation of $T_{jit}$ may be expressed as:

$$T_{jit} = \max(T_{jit} - d, T_{jitmin}) \quad (7)$$

where parameter d is an adaptive decreasing step of $T_{jit}$, which is defined as:

$$d = \max(\text{int}((T_{jit} - T_j)/m), 1) \quad (8)$$

m is a preset empirical relaxation constant and a tuning parameter, where the default value, which is based on experiments, may be set to e.g. 10.

Subsequent to both a fast attack and a slow decay, processing continues with a subsequent step 5:17, where a catchUpLimit is set, based on the just updated $T_{jit}$. In addition, adaptation interval counter cntr1 is reset to 0, $N_{min}$ is initialized to the current value of $N_{max}$ and $N_{max}$ is also reset to 0 in order to prepare the adapting procedure for a new iteration, which will be starting a new adaptation interval.

Subsequent to the adaptation of $T_{jit}$, executed in step 5:15 or 5:16, and the initialisations for the next adaptation period, executed in subsequent step 5:17, also this branch continues to the catch-up procedure, D, where the updated catchUpLimit will be used for determining if catching-up is required. After having executed the catch-up procedure, adaptation procedure B will terminate at step 5:13, and the jitter buffer algorithm continues with buffering procedure A of FIG. 4.

Figure 4:
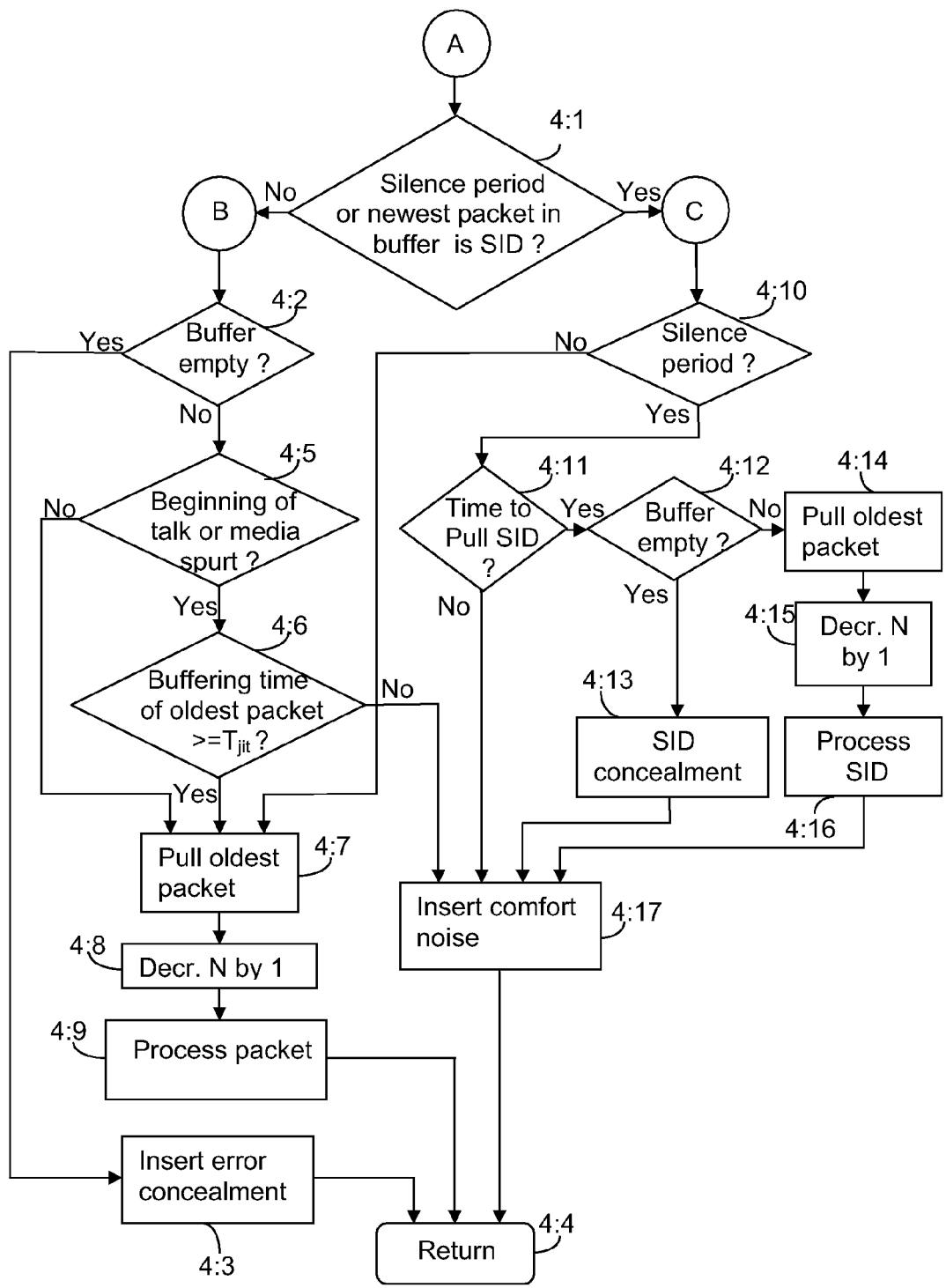
FIG. 4 illustrates the overall jitter buffering algorithm, in accordance with one embodiment.
Figure 5:
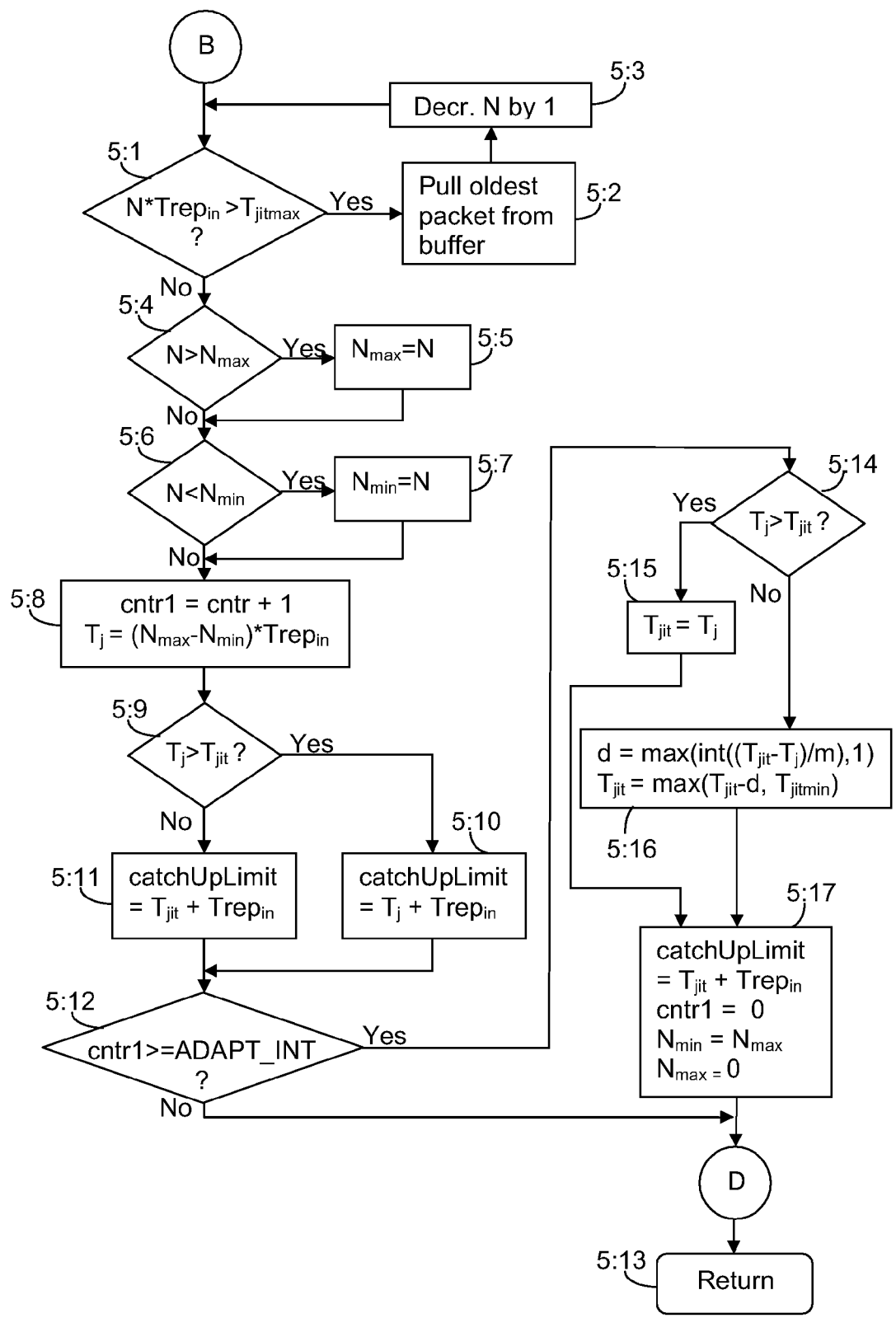
FIG. 5 illustrates an adaptation procedure to be operable during a talk spurt or a media spurt, in accordance with one embodiment.
Figure 6:
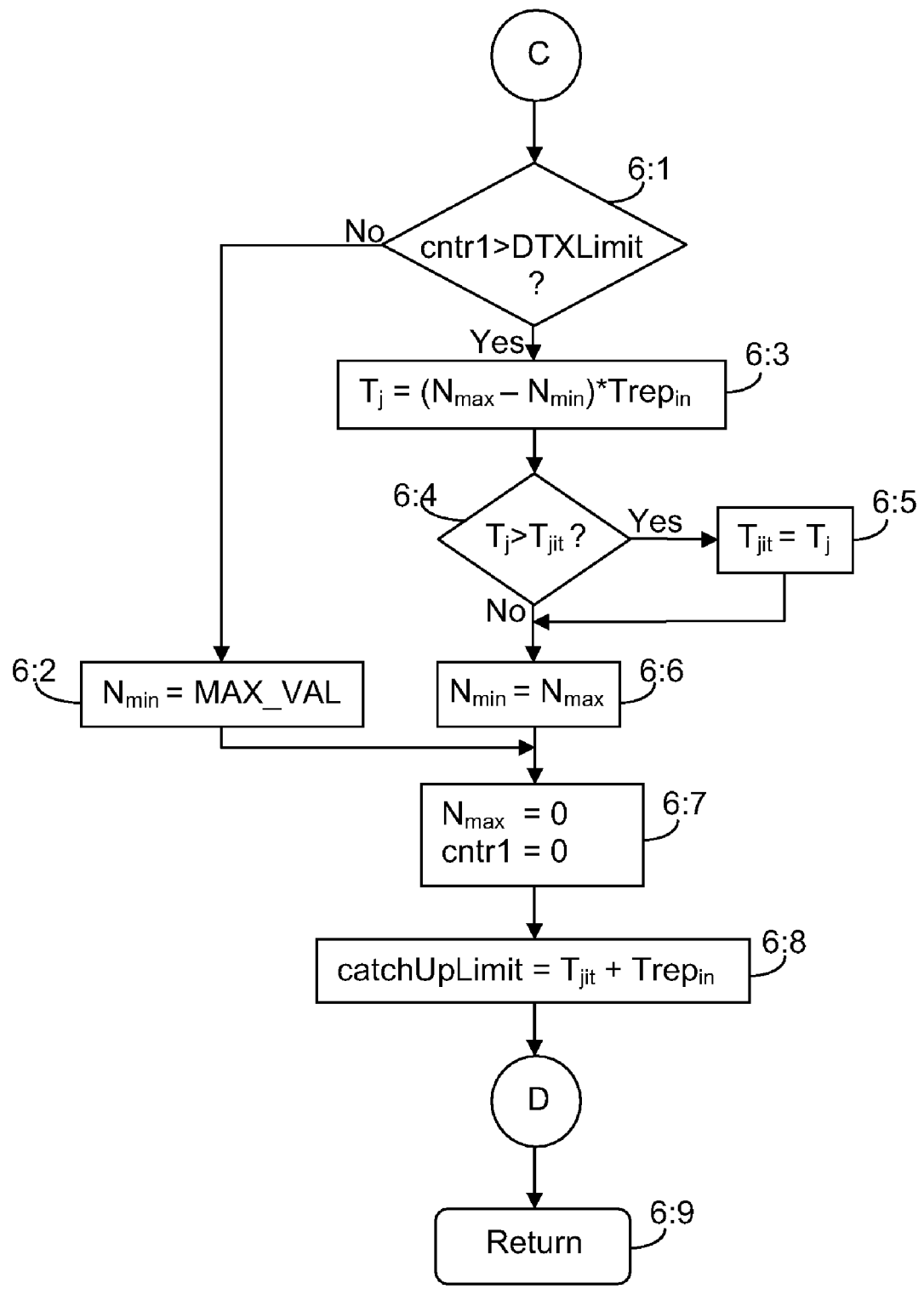
FIG. 6 illustrates an adaptation procedure to be operable during, or in the beginning of a silence period, in accordance with one embodiment.

If instead a silence period was identified at step 4:1 of FIG. 4, the jitter procedure will continue by branching to an adaptation procedure C, which is configured to adapt $T_{jit}$ during, or at the beginning of a silence period. An example of such a procedure according to one embodiment will now be described in further detail with reference to the block scheme of FIG. 6.

In a first step 6:1, the adaptation procedure determines if enough time has passed since the end of the previous adaptation interval, ADAPT_INT. Because a silence period may start at any time, usually before the expiration of the current adaptation interval, it is first determined if an adequately long time period has expired since the last adaptation of $T_{jit}$, by first comparing the current value of cntr1 to a parameter, referred to as DTXLimit. DTXLimit is a predefined constant, and a tuning parameter chosen to be smaller than ADAPT_INT. A typical default value of DTXLimit may be e.g. 2.

If it is found in step 6:1 that cntr1 has not yet exceeded DTXLimit, then not enough time has passed since the end of the previous adaptation of $T_{jit}$ occurred, and no adaptation of $T_{jit}$ will be performed. Instead, $N_{min}$ is set to MAX_VAL in a step 6:2.

If, however it is found in step 6:1 that cntr1 exceeds DTXLimit, it is determined that an adaptation of $T_{jit}$ will be required. Initially, a current $T_j$ will be calculated accordingly, on the basis of the variation of N, derived from the updated $N_{max}$ and $N_{min}$, as indicated in a next step 6:3. In a subsequent step 6:4, the updated $T_j$ is compared to the present $T_{jit}$, and if it seems that already during this premature adaptation interval in front of a silence period, the current target value $T_j$ indicates that $T_{jit}$ would need to be increased, $T_{jit}$ is increased, setting $T_{jit}$ to the present value of $T_j$ in a subsequent step 6:5, thereby executing a fast attack, in response to the recently experienced variation of N, and the current value of $T_{jit}$.

In a next step 6:6, $N_{min}$ is initialized to the current value of $N_{max}$, preparing for the next adaptation interval, starting from the beginning of the next talk spurt. Also in a subsequent step 6:7, $N_{max}$ and cntr1 are reset to 0, preparing for a next adaptation interval.

Next, an new catchUpLimit is set on the basis of the updated $T_{jit}$ in a step 6:8, prior to the execution of catch-up procedure D. Once the catch-up procedure has been executed, adaptation procedure C terminates at a final step 6:9, and the jitter adaptation algorithm continues by executing the jitter buffering procedure A of FIG. 4.

The main purpose with the catch-up procedure D, is to adapt the present delay of the jitter buffer smaller by gradually catching-up, i.e. by dropping the oldest packet from the jitter buffer in situations where there are unnecessarily many pending packets in the jitter buffer, i.e. $T_{jit}$ is unnecessarily large, based on the variable catchUpLimit, which was set in adaptation procedure B or C.

Figure 7:
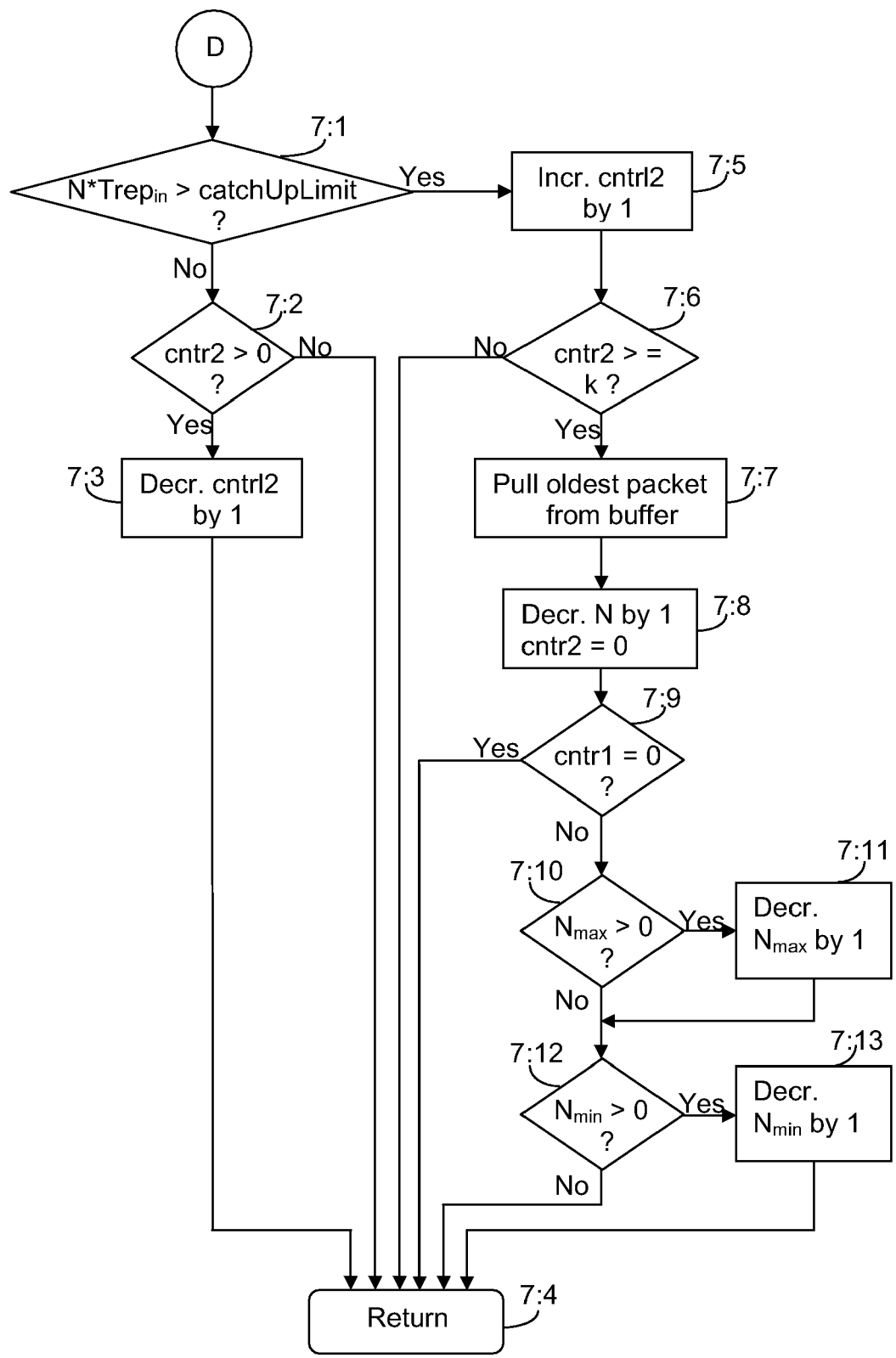
FIG. 7 illustrates a procedure for gradually adapting the buffer delay smaller, in accordance with one embodiment.

A catch-up procedure for adapting the buffer delay smaller by gradually caching-up, according to one embodiment, will now be described in further detail with reference to the block scheme of FIG. 7.

In a first step 7:1, it is determined whether the present buffering time is longer than expected, based on the variable catchUpLimit. If the longest buffering delay for the moment, i.e. the buffering delay of the oldest packet, defined as $N*Trep_{in}$, does not exceed the present catchUpLimit, then no catching-up will be needed in the jitter buffer, and, thus, catch-up procedure D terminates at a final step 7:4. The rate of a gradual catching-up will be controlled by counter cntr2, and, thus, cntr2 will be decremented by 1, prior to leaving the catch-up procedure, as indicated with a step 7:3, unless cntr2 has already reached 0, as indicated in a preceding step 7:2.

If, however, it is found in step 7:1 that the buffering delay of the oldest packet currently exceeds the present catchUpLimit, it is determined that a catching-up will be required. Counter cntr2 will assure that, as long as this condition remains valid, the oldest packet in the jitter buffer will be dropped at the rate of every k:th iteration, as indicated in a step 7:6, thereby completing the slow decay which was stared by decreasing $T_{jit}$ in step 5:16. k is a preset tuning parameter, defining a minimum catching-up period. The value of parameter k is typically chosen on the basis of experiments. A typical value of k may be 8, which corresponds to a maximum catching-up rate of 20 ms/160 ms, if $Trep_{in}$ is 20 ms.

Each time it is found that cntr2 equals k in step 7:6, a gradual catching-up will be executed, wherein the oldest packet in the jitter buffer will be pulled and discarded, from the buffer. This is illustrated with another step 7:7. Subsequent to a pulling of the oldest packet, N is updated, i.e. decremented by 1, and cntr2 is reset to 0, in order to indicate that a catching-up has been performed, in a next step 7:8. Next it is determined if the adaptation interval, ADAPT_INT, has just ended concurrently with the current catching-up period, i.e. if cntr1 equals 0. This is verified in a step 7:9. If this is the case, catching-up procedure D will be terminated at step 7:4. If, however, cntr1 exceeds 0, $N_{max}$ and $N_{min}$, must be updated, i.e. decremented by 1, in order to take into account that the oldest packet has just been dropped from the jitter buffer. This procedure is indicated with steps 7:10-7:13. Subsequent to the execution of catch-up procedure D, the procedure returns to the respective adaptation procedure B or C.

Although the embodiment described above presented with reference to FIGS. 3-7 refers to a buffering method for buffering speech packets transmitted in a speech burst, the method may be applicable also for handling other types of jitter sensitive media, such as e.g. video, delivered via packets, other than speech packets, in this document referred to as media packets. It is to be understood that instead of being delivered in a speech burst, media packets arriving to the buffer are delivered in a media burst. However, since the silence period, as well as SID, is defined only for speech some adaptations of the method have to be made when media packets, delivered in a media spurt, are to be handled. By keeping the talk spurt/media spurt branch, B of FIG. 4 on during a streaming session, delivering a media burst, while the silence period branch, C is disabled, the described method may be adapted also for buffering media other than speech.

Figure 8:
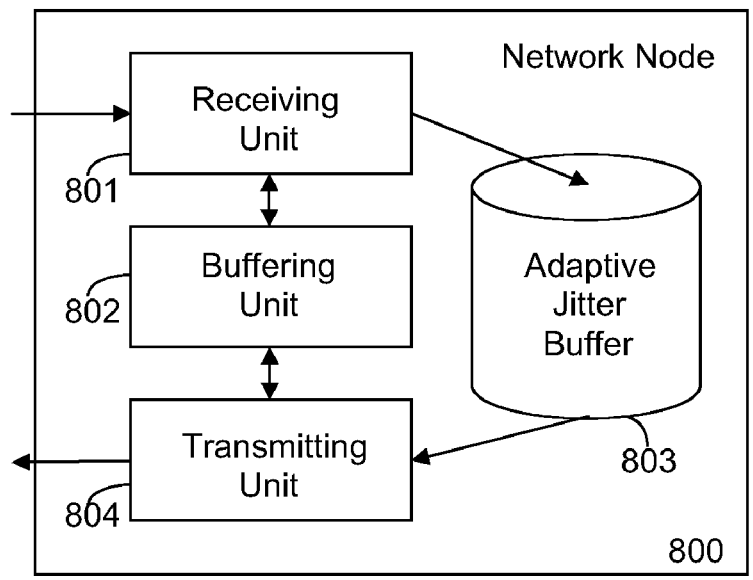
FIG. 8 illustrates a typical network node, comprising an adaptive jitter buffer adapted to operate in accordance with the jitter buffering algorithm, according to one embodiment.
Figure 9A:
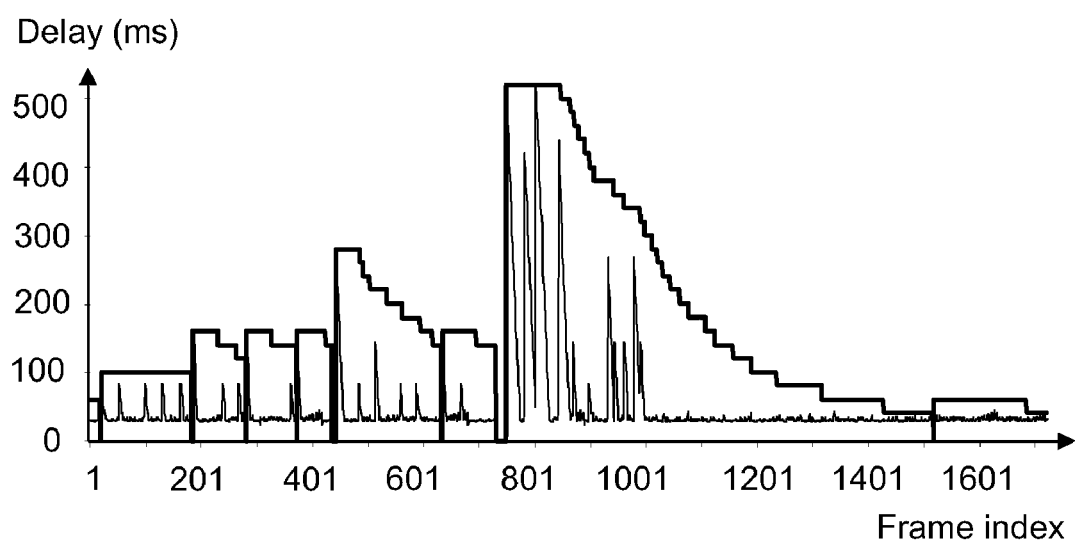
FIG. 9a illustrates an exemplary performance of a jitter buffer algorithm, according to one embodiment with DTX disabled.
Figure 9B:
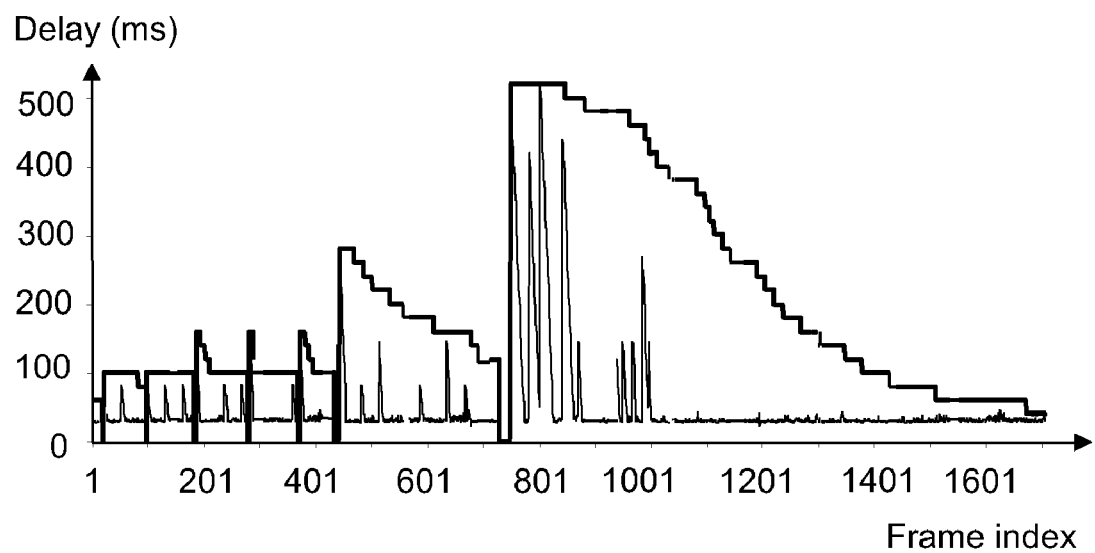
FIG. 9b illustrates another exemplary performance of a jitter buffer algorithm, according to another embodiment with DTX enabled.

A typical network node, comprising an adaptive jitter buffer adapted to operate in accordance with the jitter buffer algorithm described in this document will now be described with reference to the block diagram of FIG. 8. The Network node 800 of FIG. 8 comprises a Receiving unit 801, which is receiving packets arriving from a packet switching network (not shown) to which the node is connected. A Buffering Unit 802 is adapted to execute the method for dynamically adjusting the buffer delay, which has been described above. The buffering unit controls the insertion of packets to an Adaptive Jitter Buffer 803, via the receiving unit 801, and the pulling of packets from the adaptive jitter buffer 803, via a Transmitting Unit 804. Once a packet has been pulled to the transmitting unit 804 from the adaptive jitter buffer 803, the packet is transmitted to a receiving network (not shown). An exemplary performance of the described jitter buffering algorithm, illustrated with the delay in ms as a function of the frame index, is shown in FIGS. 9a and 9b, where FIG. 9a, illustrates a simulation with discontinuous transmission of speech, i.e. DTX, disabled, while FIG. 9b illustrates a simulation with DTX enabled.

Both simulations were run with the same audio sample file and the same transport delay profile used. In both figures, the thin line represents the input transport delay, while the thick line illustrates the total delay, including the buffer delay at the play-out. Each occasion where the thick line drops to the x-axis indicates a buffer underflow, caused by a delay spike.

The present invention refers to an adaptive jitter buffer of limited complexity, provided at a network node. The adaptive jitter buffer does not require access to time stamp information, i.e. no access to the IP layer is required. Instead of relying on time stamp information, the jitter buffer is adapted to handle coded speech packets/frames directly. The monitored variation of the number of packets in the jitter buffer is used for estimating the required jitter protection time, $T_{jit}$. By adding error concealment packets or by removing the oldest speech packets from the jitter buffer, according to the updated $T_{jit}$, the experienced jitter buffer delay will be adaptable to the present arriving rate of packets at the input of the network node.

While the invention has been described with reference to specific exemplary embodiments, the description is generally only intended to illustrate the inventive concept and should not be taken as a limitation of the scope of the invention, which is defined by the appended claims.

ABBREVIATION LIST

DTX Discontinuous transmission
SID Silence Insertion Descriptor

The invention claimed is:

1. A method at a network node comprising an adaptive jitter buffer of dynamically adjusting the buffer delay of said adaptive jitter buffer when receiving media stream packets of a media stream from a packet switched network, wherein said method comprises the following steps:
inserting packets arriving to the network node into the jitter buffer,
iteratively adapting the jitter buffer at an interval, $Trep_{in}$, when said media stream is in a media or talk spurt, such that a jitter protection time, $T_{jit}$, is being updated on the basis of the variation, $N_{max}-N_{min}$ of the number of packets, N, pending in the jitter buffer, $T_{jit}$ being a current target value for the maximum buffering delay for said jitter buffer, each iteration being executed by:
updating a smallest value, $N_{min}$, and a largest value, $N_{max}$, of N, N being monitored over an adaptation interval, ADAPT_INT, ADAPT_INT, defining a predetermined number of iterations,
calculating a new target value, $T_j$, on the basis of the variation of N, $T_j$ being an indicator of the required adaptation of $T_{jit}$, such that:

$T_j=(N_{max}-N_{min})*Trep_{in}$ and
adjusting $T_{jit}$ with the value of $T_j$ in case the number of iterations since the last adjustment of $T_{jit}$ equals ADAPT_INT.

2. A method according to claim 1, wherein said adjusting step comprises the following step:
increasing $T_{jit}$ according to $T_j$ in case the variation of N is higher than what the current $T_{jit}$ can handle, or
decreasing $T_{jit}$ according to $T_j$, in case the current $T_{jit}$ is dimensioned for a larger variation of N than the current variation.

3. A method according to claim 1, wherein said adjusting step further comprises the following steps:
instantly updating $T_{jit}$ to equal $T_j$, executing a fast attack, in case $T_j$ exceeds $T_{jit}$, or
gradually decreasing $T_{jit}$ towards the current $T_j$, performing a slow decay, and gradually dropping the oldest packet from the buffer at a relaxed rate until $T_{jit}$ corresponds to the current variation of N in case the present maximum buffer delay time, $N*Trep_{in}$ exceeds a predetermined threshold, catchUpLimit.

4. A method according to claim 3 wherein catchUpLimit is defined as:

catchUpLimit=$T_j$+$Trep_{in}$ in case $T_{jit}$ has not been updated and the current $T_j$ exceeds the current $T_{jit}$, or as:

catchUpLimit=$T_{jit}$+$Trep_{in}$ otherwise.

5. A method according to claim 1, wherein said media stream is any of an audio stream or a video stream.

6. A method at a network node comprising an adaptive jitter buffer of dynamically adjusting the buffer delay of said adaptive jitter buffer when receiving media stream packets of a media stream from a packet switched network, wherein said method comprises the following steps to be executed, wherein said method comprises the following steps to be executed during a silence period or in case the most recently received packet is a SID:

inserting packets arriving to the network node into the jitter buffer, iteratively adapting the jitter buffer at an interval, $Trep_{in}$, such that a jitter protection time, $T_{jit}$, is being updated on the basis of the variation, $N_{max}-N_{min}$, of the number of packets, N, pending in the jitter buffer in case the number of iterations during a talk spurt since the last adaptation of $T_{jit}$ exceeds a predetermined silence period adaptation limit, DTXLimit, $T_{jit}$ being a current target value for the maximum buffering delay for said jitter buffer, each iteration being executed by:

calculating an updated target value, $T_j$ for $T_{jit}$, on the basis of the variation of N, $T_j$ being an indicator of the required adaptation of $T_{jit}$, such that:

$T_j = (N_{max}-N_{min})*Trep_{in}$ and increasing $T_{jit}$ with the calculated value of $T_j$ in case the variation of N is higher than what the current $T_{jit}$ can handle.

7. A method according to claim 6 wherein said adjusting step further comprises the following steps:

instantly updating $T_{jit}$ to equal executing a fast attack, in case $T_j$ exceeds $T_{jit}$, and gradually dropping the oldest packet from the buffer at a relaxed rate until $T_{jit}$ corresponds to the current variation of N, in case the present buffer delay time, $N*Trep_{in}$ exceeds a predetermined threshold, catchUpLimit.

8. A method according to claim 7, wherein catchUpLimit is defined as:

catchUpLimit=$T_j$+$Trep_{in}$.

9. A network node comprising an adaptive jitter buffer for receiving packets of a media stream from a packet switched network, said node being adapted to dynamically adjust the buffer delay of said buffer, wherein the node comprises:

a receiving unit adapted to receive packets arriving to the node, a buffering unit adapted to insert packets arriving to the network node into the jitter buffer, and to iteratively adapt the jitter buffer at an interval, $Trep_{in}$, when said media stream is in a media or talk spurt, such that a jitter protection time, $T_{jit}$, is being updated on the basis of the variation, $N_{max}-N_{min}$ of the number of packets, N, pending in the jitter buffer, $T_{jit}$ being a current target value for the maximum buffering delay for said jitter buffer, said buffering unit being adapted to execute each iteration by:

updating a smallest value, $N_{min}$, and a largest value, $N_{max}$, of N, by monitoring N over an adaptation interval, ADAPT_INT, ADAPT_INT defining a predetermined number of iterations of the adaptation procedure, calculating a target value, $T_j$, on the basis of the variation of N, $T_j$ being an indicator of the required adaptation of $T_{jit}$, such that:

$T_j=(N_{max}-N_{min})*Trep_{in}$ and adjusting $T_{jit}$ according to $T_j$ in case the number of iterations since the last adjustment of $T_{jit}$ equals ADAPT_INT.

10. A node according to claim 9, wherein when executing said adjusting step, the buffering unit is further adapted to execute the following steps:

increasing $T_{jit}$ according to $T_j$ in case the variation of N is higher than what the current $T_{jit}$ can handle, or decreasing $T_{jit}$ according to $T_j$, in case the current $T_{jit}$ is dimensioned for a larger variation of N than the current variation.

11. A node according to claim 9, wherein said buffering unit is further adapted to execute the following steps when executing the adjusting step:

instantly updating $T_{jit}$ to equal $T_j$, executing a fast attack, in case $T_j$ exceeds $T_{jit}$, or gradually decreasing $T_{jit}$ towards the current $T_j$, performing a slow decay, and gradually dropping the oldest packet from the buffer at a relaxed rate until $T_{jit}$ corresponds to the current variation of N in case the present maximum buffer delay time, $N*Trep_{in}$ exceeds a predetermined threshold, catchUpLimit.

12. A node according to claim 11 wherein said buffering unit is adapted to define catchUpLimit as:

catchUpLimit=$T_j$+$Trep_{in}$ in case $T_{jit}$ has not been updated and the current $T_j$ exceeds the current $T_{jit}$, or as:

catchUpLimit=$T_{jit}$+$Trep_{in}$ otherwise.

13. A network node comprising an adaptive jitter buffer for receiving packets of a media stream from a packet switched network, said node being adapted to dynamically adjust the buffer delay of said buffer, wherein the node comprises:

a receiving unit adapted to receive packets arriving to the node, a buffering unit adapted to insert packets arriving to the network node into the jitter buffer, and iteratively adapting the jitter buffer at an interval, $Trep_{in}$, such that a jitter protection time, $T_{jit}$, is being updated on the basis of the variation, $N_{max}-N_{min}$, of the number of packets, N, pending in the jitter buffer, in case the number of iterations during a talk spurt since the last adaptation of $T_{jit}$ exceeds a predetermined silence period adaptation limit, DTXLimit, $T_{jit}$ being a current target value for the maximum buffering delay for said jitter buffer, each iteration being executed by:

calculating an updated target value, $T_j$ for $T_{jit}$, on the basis of the variation of N, $T_j$ being an indicator of the required adaptation of $T_{jit}$, such that:

$T_j=(N_{max}-N_{min})*Trep_{in}$ and
increasing $T_{jit}$ with the calculated value of $T_j$ in case the variation of N is higher than what the current $T_{jit}$ can handle.

14. A node according to claim 13, wherein during said adjusting step, the buffering unit is further adapted to execute the following steps:
instantly updating $T_{jit}$ to equal $T_j$, executing a fast attack, in case $T_j$ exceeds $T_{jit}$, and
gradually dropping the oldest packet from the buffer at a relaxed rate until $T_{jit}$ corresponds to the current variation of N, in case the present buffer delay time, $N*Trep_{in}$ exceeds a predetermined threshold, catchUpLimit.

* * * * *

UNITED STATES PATENT AND TRADEMARK OFFICE
CERTIFICATE OF CORRECTION

PATENT NO. : 8,254,376 B2  
APPLICATION NO. : 12/811667  
DATED : August 28, 2012  
INVENTOR(S) : Mahkonen Page 1 of 1

It is certified that error appears in the above-identified patent and that said Letters Patent is hereby corrected as shown below:

In the Specifications

In Column 3, Line 30, delete "$Trep_i$," and insert -- $Trep_{in}$ --, therefor.

In Column 7, Line 22, delete "$T_{jit}$," and insert -- $T_{jit}$ --, therefor.

In Column 7, Line 61, delete "$N_{min}$" and insert -- $N_{min}$, --, therefor.

In Column 8, Line 28, delete "time," and insert -- time, $T_{jit}$. --, therefor.

In Column 11, Line 35, delete "T," and insert -- $T_j$, --, therefor.

In Column 13, Line 5, delete "stared" and insert -- started --, therefor.

In the Claims

In Column 15, Line 47, in Claim 7, delete "equal" and insert -- equal $T_j$, --, therefor.

Signed and Sealed this  
Seventeenth Day of December, 2013

Margaret A. Focarino  
*Commissioner for Patents of the United States Patent and Trademark Office*